United States Patent
Sondre (10) Patent No.: US 12,227,067 B2
(45) Date of Patent: Feb. 18, 2025

(54) METHOD FOR ASSEMBLING A TANK ASSEMBLY FOR A VEHICLE

(71) Applicant: Volvo Truck Corporation, Gothenburg (SE)

(72) Inventor: Landvik Sondre, Gothenburg (SE)

(73) Assignee: Volvo Truck Corporation, Gothenburg (SE)

( * ) Notice: Subject to any disclaimer, the term of this patent is extended or adjusted under 35 U.S.C. 154(b) by 178 days.

(21) Appl. No.: 17/783,055

(22) PCT Filed: Dec. 11, 2019

(86) PCT No.: PCT/EP2019/084665
§ 371 (c)(1),
(2) Date: Jun. 7, 2022

(87) PCT Pub. No.: WO2021/115588
PCT Pub. Date: Jun. 17, 2021

(65) Prior Publication Data
US 2023/0014147 A1    Jan. 19, 2023

(51) Int. Cl.
*B60K 15/07* (2006.01)
*B60K 15/03* (2006.01)

(52) U.S. Cl.
CPC ........ *B60K 15/07* (2013.01); *B60K 15/03006* (2013.01); *B60K 2015/03032* (2013.01); *B60K 2015/03151* (2013.01)

(58) Field of Classification Search
CPC .............. B60K 15/07; B60K 15/03006; B60K 2015/03032; B60K 2015/03151

USPC ........................................................ 280/834
See application file for complete search history.

(56) References Cited

U.S. PATENT DOCUMENTS

| | | | | |
|---|---|---|---|---|
| 5,054,799 A | * | 10/1991 | Fingerle | B62D 35/001 280/833 |
| 6,257,360 B1 | * | 7/2001 | Wozniak | B60K 15/013 180/69.5 |
| 7,303,211 B2 | * | 12/2007 | Borroni-Bird | B60K 1/04 280/783 |
| 8,608,202 B2 | | 12/2013 | Dossow | |
| 2009/0189384 A1 | * | 7/2009 | Schoen | B60K 15/067 280/834 |
| 2012/0161430 A1 | * | 6/2012 | Mulanon | F17C 13/084 280/834 |

(Continued)

FOREIGN PATENT DOCUMENTS

| | | | |
|---|---|---|---|
| DE | 102017005448 A1 | 12/2017 | |
| EP | 3078533 A1 * | 10/2016 | ........... B60K 15/063 |

(Continued)

OTHER PUBLICATIONS

SE_1650865_A1 (Anel et al.) (Dec. 12, 2017) (Machine Translation) (Year: 2017).*

(Continued)

*Primary Examiner* — Mahmoud Gimie
(74) *Attorney, Agent, or Firm* — Withrow & Terranova, PLLC (57) ABSTRACT

A method for assembling a tank assembly for a vehicle. The tank assembly comprises a plurality of tanks comprising a plurality of tank subsets comprising a first tank subset and a second tank subset. The first and second tank subsets are adapted to be adjacent in the tank assembly.

15 Claims, 7 Drawing Sheets

(56) References Cited

U.S. PATENT DOCUMENTS

2014/0069972 A1* 3/2014 Willemsen ........... B60K 15/063
                                                           224/401
2015/0096977 A1* 4/2015 Sirosh ................ F02M 21/0296
                                                           248/313

FOREIGN PATENT DOCUMENTS

| SE | 1650865 | A1 | * | 12/2017 |
| SE | 1651100 | A1 | * | 2/2018 |
| WO | 2018030931 | A1 | | 2/2018 |

OTHER PUBLICATIONS

International Search Report and Written Opinion for International Patent Application No. PCT/EP2019/084665, mailed Jul. 16, 2020, 11 pages.

* cited by examiner

METHOD FOR ASSEMBLING A TANK ASSEMBLY FOR A VEHICLE

This application is a 35 USC 371 national phase filing of International Application No. PCT/EP2019/084665, filed Dec. 11, 2019, the disclosure of which is incorporated herein by reference in its entirety.

TECHNICAL FIELD

The invention relates to a method for assembling a tank assembly for a vehicle. Moreover, the present invention relates to a method for attaching a tank assembly to a vehicle. Furthermore, the present invention relates to a kit for assembling a tank assembly for a vehicle.

The invention can be applied in heavy-duty vehicles, such as trucks, buses and construction equipment. Although the invention will be described with respect to a truck, the invention is not restricted to this particular vehicle, but may also be used in other vehicles such as buses, marine vessels or working machines.

BACKGROUND

A vehicle may comprise a tank assembly comprising a plurality of tanks. For instance, a tank assembly may be used for storing fuel for a propulsion system of the vehicle. In order to furnish a vehicle with a tank assembly in a time efficient manner, the tank assembly may be assembled separately and the thus assembled tank assembly may thereafter be attached to the vehicle, for instance to a frame of the vehicle.

An example of vehicle fuel tank assembly is disclosed in WO 2018/030931 A1. However, the WO 2018/030931 A1 fuel tank assembly cannot be assembled in an efficient manner.

SUMMARY

An object of the invention is to provide a method for assembling a tank assembly, which method implies a flexible assembling procedure.

According to a first aspect of the invention, the above object is achieved by a method according to claim 1.

As such, the present invention relates to a method for assembling a tank assembly for a vehicle. The tank assembly comprises a plurality of tanks comprising a plurality of tank subsets comprising a first tank subset and a second tank subset. The first and second tank subsets are adapted to be adjacent in the tank assembly.

The method comprises:
  connecting a first side bracket assembly to a first side of the first tank subset,
  connecting a first side of a first intermediate bracket assembly to a second side of the first tank subset, wherein the first intermediate bracket assembly comprises a second side adapted to be connected to a first side of the second tank subset, wherein the first side bracket assembly and the first intermediate bracket assembly are located on opposite sides of the first tank subset, and
  attaching the first side bracket assembly to the first intermediate bracket assembly before the second tank subset is connected to the second side of the first intermediate bracket assembly.

By virtue of the fact that the first side bracket assembly is attached to the first intermediate bracket assembly before the second tank subset is connected to the second side of the first intermediate bracket assembly, an assembling method is obtained in which the first tank subset is fixed between the first side bracket assembly and the first intermediate bracket assembly before a subsequent assembling step, such as adding a second tank subset, needs to be performed. This in turn implies a flexible assembling method since assembling can be performed with a low amount of loose parts during each step of the assembly.

Optionally, the following is performed for the last tank subset to be added to the tank assembly:
  connecting a second side of a previously attached intermediate bracket assembly to the first side of the last tank subset,
  connecting a second side bracket assembly to a second side of the last tank subset, wherein the previously attached intermediate bracket assembly and the second side bracket assembly are located on opposite sides of the last tank subset,
  attaching the second side bracket assembly to the previously attached intermediate bracket assembly.

Optionally, the method further comprises the following procedure sequentially for each tank subset adapted to be located between the first tank subset and the last tank subset, wherein the first intermediate bracket assembly forms a previously attached intermediate bracket assembly for the second tank subset:
  connecting a second side of the previously attached intermediate bracket assembly to the first side of the tank subset to be added to the tank assembly,
  connecting a further intermediate bracket assembly to a second side of the tank subset to be added to the tank assembly, wherein the further intermediate bracket assembly and the previously attached intermediate bracket assembly are located on opposite sides of the tank subset to be added to the tank assembly,
  attaching the further intermediate bracket assembly to the previously attached intermediate bracket assembly before a tank subset adapted to be subsequently added to the tank assembly is connected to the second side of the further intermediate bracket assembly,
  assigning the further intermediate bracket assembly to constitute the previously attached intermediate bracket assembly for a tank subset adapted to be subsequently added to the tank assembly.

Owing to the fact that each tank subset is fixed between the first previously attached intermediate bracket assembly and the further intermediate bracket assembly during the above assembly method embodiment, a flexible assembly method is obtained wherein the number of tank subsets may be varied between different tank assemblies without the need for changing assembly tools and/or assembling procedures.

Optionally, the tanks are arranged in parallel and each one of the tanks is elongate and extends along a main extension direction. The first and second sides of each tank subset extend in a plane comprising the main extension direction.

Optionally, each tank subset comprises at least two tanks.

Optionally, the method further comprises fluidly connecting the tanks of said tank subsets to each other.

The fluid connection of the tanks to each other may preferably be made before the tank assembly is attached to a vehicle. By way of example, the fluid connections may be obtained by fluidly connecting tanks of the tank assembly by pipes.

Optionally, each tank is a fuel tank, preferably each tank is adapted store fuel at a pressure exceeding 10 bar, preferably exceeding 200 bar, more preferred exceeding 300 bar.

A second aspect of the present invention relates to a method for attaching a tank assembly to a vehicle, wherein the tank assembly has been assembled according to the first aspect of the present invention before being connected to the vehicle. The method comprises:

attaching a mounting bracket assembly to the vehicle,
connecting the tank assembly to the mounting bracket assembly using one or more straps.

Optionally, the step of connecting the tank assembly to the mounting bracket assembly using one or more straps comprises connecting the first side bracket assembly to the mounting bracket assembly.

Optionally, the method comprises connecting the tank assembly to the mounting bracket assembly using one or more straps enclosing the tank assembly.

Optionally, the one or more straps are connected to the second side bracket assembly.

Optionally, the stiffness of the mounting bracket assembly is substantially lower than the stiffness of a vehicle frame of the vehicle.

Arranging the stiffness of the mounting bracket assembly to be substantially lower than the stiffness of a vehicle frame of the vehicle implies that the tank assembly will have an appropriately small influence on the overall stiffness of the vehicle.

Optionally, the mounting bracket assembly comprises a mounting bracket and a mounting bracket attachment member for attaching the mounting bracket to the vehicle. The mounting bracket is elongate with a main extension and the mounting bracket has a mounting bracket length along the main extension. The length of the mounting bracket attachment member along the main extension is less than 50%, preferably less than 30%, of the mounting bracket length.

A length in any one of the above ranges implies that the stiffness of the mounting bracket assembly will be relatively low as compared to the stiffness of the vehicle frame.

A third aspect of the present invention relates to a kit for assembling a tank assembly for a vehicle. The kit comprises a first side bracket assembly, a second side bracket assembly and one or more intermediate bracket assemblies, the kit being adapted to be used in a method according to any one of the preceding claims.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

The invention will be described below for a vehicle in the form of a truck 10 such as the truck illustrated in FIG. 1. The truck 10 should be seen as an example of a vehicle which could comprise a tank assembly that has been assembled in accordance with the present invention. However, a tank assembly assembled in accordance with a method embodiment of the present invention may be implemented in a plurality of different types of vehicles. Purely by way of example, a tank assembly could be connected to a truck, a tractor, a car, a bus, a work machine such as a wheel loader or any other type of construction equipment.

Figure 1:
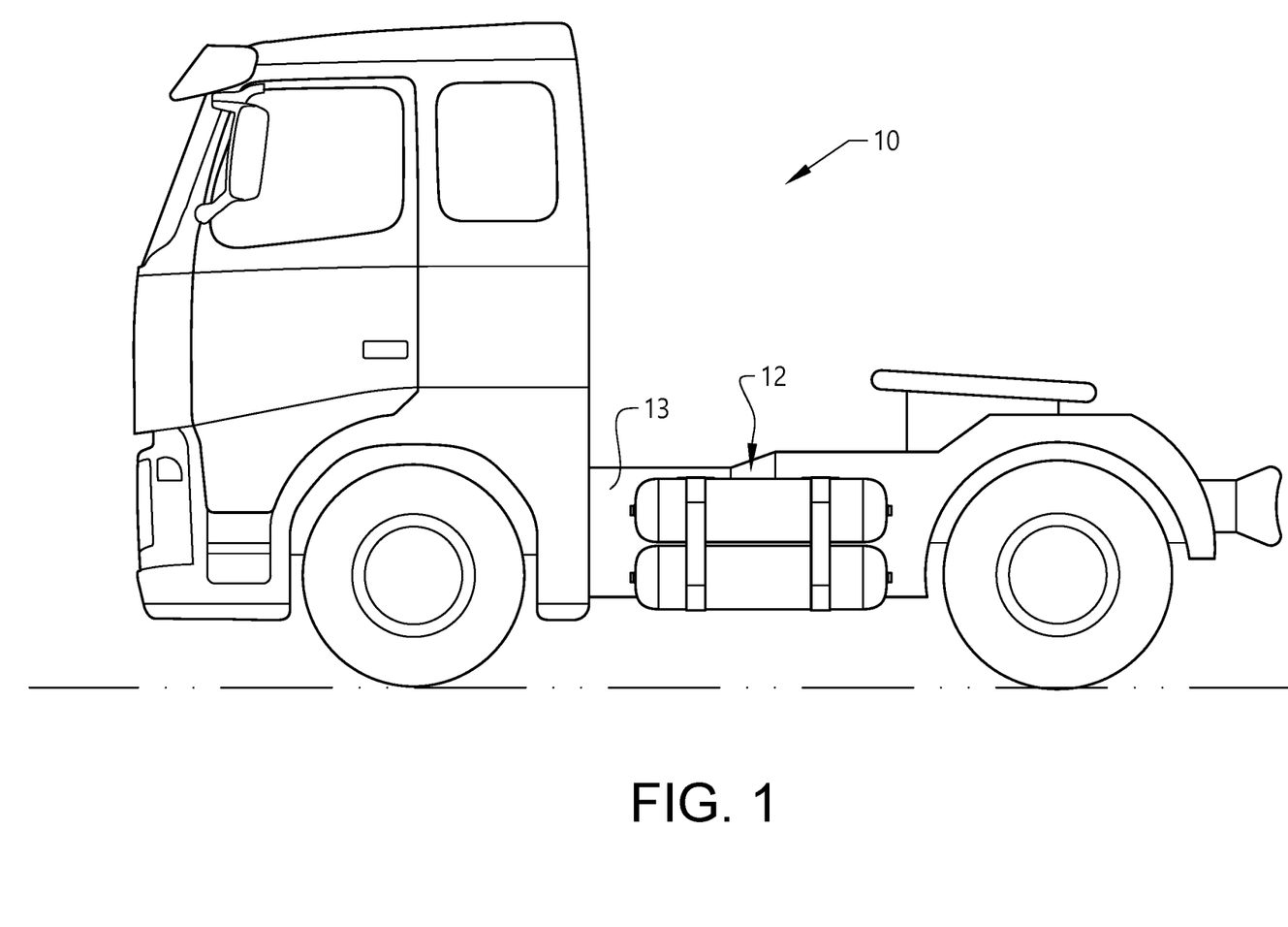
FIG. 1 is a side view of a vehicle.

The FIG. 1 vehicle 10 comprises a tank assembly 12. Purely by way of example, the tank assembly 12 may be adapted to supply fuel to a propulsion system (not shown) for propelling the vehicle 10. FIG. 1 further illustrates that the vehicle comprises a frame 13 to which the tank assembly 12 may be connected.

Figure 2A:
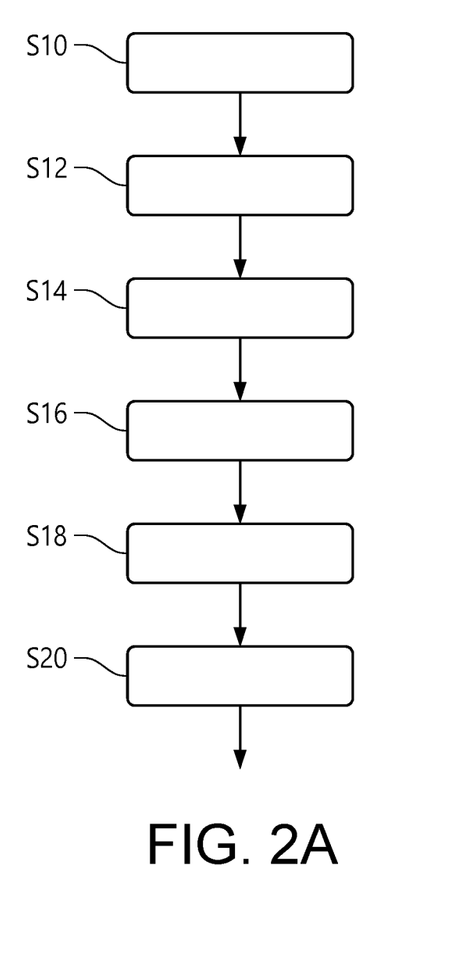
FIG. 2A-2B illustrate an assembling method embodiment in accordance the present invention.
Figure 2B:
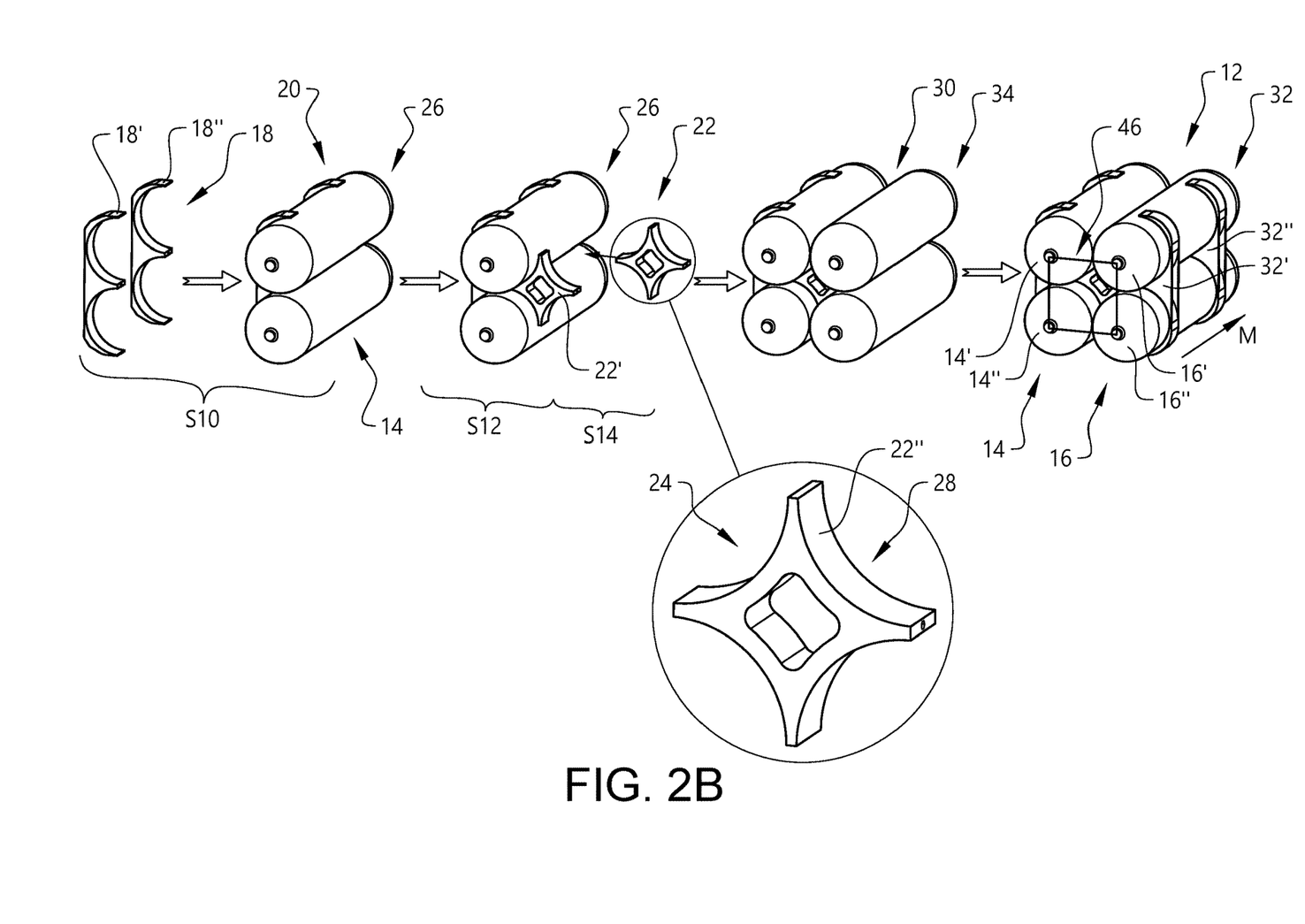

The present invention relates to a method for assembling a tank assembly 12 for a vehicle 10. FIG. 2A and FIG. 2B illustrate an embodiment of the method according to the present invention wherein the complete tank assembly 12 is presented in the end of the FIG. 2B procedure.

As may be gleaned from FIG. 2B, the tank assembly 12 comprises a plurality of tanks comprising a plurality of tank subsets comprising a first tank subset 14 and a second tank subset 16. The first and second tank subsets 14, 16 are adapted to be adjacent in the tank assembly 12.

Purely by way of example, and as illustrated in FIG. 2B, the tanks may be arranged in parallel and each one of the tanks is elongate and extends along a main extension direction M.

FIG. 2A and FIG. 2B further illustrate an embodiment of the method for assembling the tank assembly 12, which method comprises:

S10 Connecting a first side bracket assembly 18 to a first side 20 of the first tank subset 14. As may be gleaned from FIG. 2B, the first side bracket assembly 18 in the illustrated embodiment comprises two first side brackets 18', 18".

S12 Connecting a first side 24 of a first intermediate bracket assembly 22 to a second side 26 of the first tank subset 14, wherein the first intermediate bracket assembly 22 comprises a second side 28 adapted to be connected to a first side 30 of the second tank subset 16. Furthermore, as illustrated in FIG. 2B, the first side bracket assembly 18 and the first intermediate bracket assembly 22 are located on opposite sides of the first tank subset 14. As may be gleaned from FIG. 2B, the first intermediate bracket assembly 22 in the illustrated embodiment comprises two first intermediate brackets 22', 22".

S14 Attaching the first side bracket assembly 18 to the first intermediate bracket assembly 22 before the second tank subset 16 is connected to the second side 28 of the first intermediate bracket assembly 22. Purely by way of example, the above attachment may be achieved by a bolt joint (not shown) although other attachment means, such as a weld joint (not shown) are also envisaged.

As such, after steps S10-S14 hereinabove have been carried out, an interim aggregate has been obtained comprising the first tank subset 14, the first side bracket assembly 18 and the first intermediate bracket assembly 22. The interim aggregate comprises components that have been connected to each other, thus making it possible to add further components to the tank assembly 12 in a straightforward manner.

As a non-limiting example, in order to prevent the first tank subset 14 from moving relative to each one of the first side bracket assembly 18 and the first intermediate bracket assembly 22 when the first side bracket assembly 18 and the first intermediate bracket assembly 22 are attached to each other, at least one of the first side bracket assembly 18 and the first intermediate bracket assembly 22 may be shaped such that relative movement is prevented. In the FIG. 2B embodiment, the first side bracket assembly 18 is such that it prevents motions up, down and sideways, as seen in the plane of FIG. 2B, of the first tank subset 14 relative to the first side bracket assembly 18. Moreover, relative motions along the main extension direction M may be prevented by frictional forces built up between the first side bracket assembly 18 and/or the first intermediate bracket assembly 22 and the first tank subset 14. To this end, though purely by way of example, a high friction material, such as a rubber panel, may be located between the first side bracket assembly 18 and the first tank subset 14 and/or between the first intermediate bracket assembly 22 and the first tank subset 14. As a non-limiting example, the first side bracket assembly 18 may comprise one or more contact surfaces, adapted to contact the first tank subset 14, which one or more surfaces are lined with a high friction material, such as a rubber material. Moreover, again as a non-limiting example, the first intermediate bracket assembly 22 may comprise one or more contact surfaces, adapted to contact the first tank subset 14, which one or more surfaces are lined with a high friction material, such as a rubber material.

FIG. 2A and FIG. 2B further illustrate an embodiment of the method according to the present invention wherein the following is performed for the last tank subset 16 to be added to the tank assembly 12:

S16 Connecting a second side 28 of the previously attached intermediate bracket assembly 22 to the first side 30 of the last tank subset 16. In the FIG. 2B assembly, the second tank subset 16 constitutes the last tank subset to be added to the tank assembly 12 and the previously attached intermediate bracket assembly 22 is the first intermediate bracket assembly 22.

S18 Connecting a second side bracket assembly 32 to a second side 34 of the last tank subset 16, wherein the previously attached intermediate bracket assembly 22 and the second side bracket assembly 32 are located on opposite sides of the last tank subset 16. As may be gleaned from FIG. 2B, the second side bracket assembly 32 in the illustrated embodiment comprises two second side brackets 32', 32".

S20 Attaching the second side bracket assembly 32 to the previously attached intermediate bracket assembly 22. Again, though purely by way of example, the above attachment may be achieved by a bolt joint (not shown) although other attachment means, such as a weld joint (not shown) are also envisaged.

When steps S16-S20 have been carried out, the tank assembly 12 has been obtained. The tank assembly is self-supporting which makes it easy connect the tank assembly 12 to a vehicle.

As a non-limiting example, in order to prevent the last tank subset 16 from moving relative to each one of the previously attached intermediate bracket assembly 22 and the second side bracket assembly 32 when the previously attached intermediate bracket assembly 22 and the second side bracket assembly 32, at least one of the previously attached intermediate bracket assembly 22 and the second side bracket assembly 32 may be shaped such that relative movement is prevented. In the FIG. 2B embodiment, the second side bracket assembly 32 is such that it prevents motions up, down and sideways, as seen in the plane of FIG. 2B, of the last tank subset 16 relative to the second side bracket assembly 32.

Moreover, relative motions along the main extension direction M may be prevented by frictional forces built up between the previously attached intermediate bracket assembly 22 and/or the second side bracket assembly 32 and the last tank subset 16. To this end, though purely by way of example, a high friction material, such as a rubber panel, may be located between the previously attached intermediate bracket assembly 22 and the last tank subset 16 and/or between the second side bracket assembly 32 and the last tank subset 16. As a non-limiting example, the previously attached intermediate bracket assembly 22 may comprise one or more contact surfaces, adapted to contact the last tank subset 16, which one or more surfaces are lined with a high friction material, such as a rubber material. Moreover, again as a non-limiting example, the second side bracket assembly 32 may comprise one or more contact surfaces, adapted to contact the last tank subset 16, which one or more surfaces are lined with a high friction material, such as a rubber material.

Figure 3A:
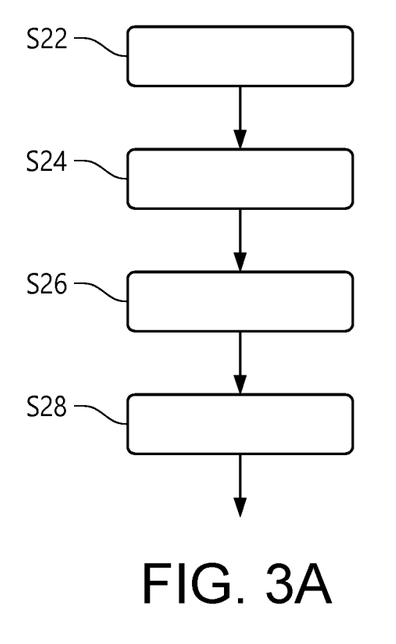
FIG. 3A-3B illustrate a portion of another assembling method embodiment in accordance the present invention.
Figure 3B:
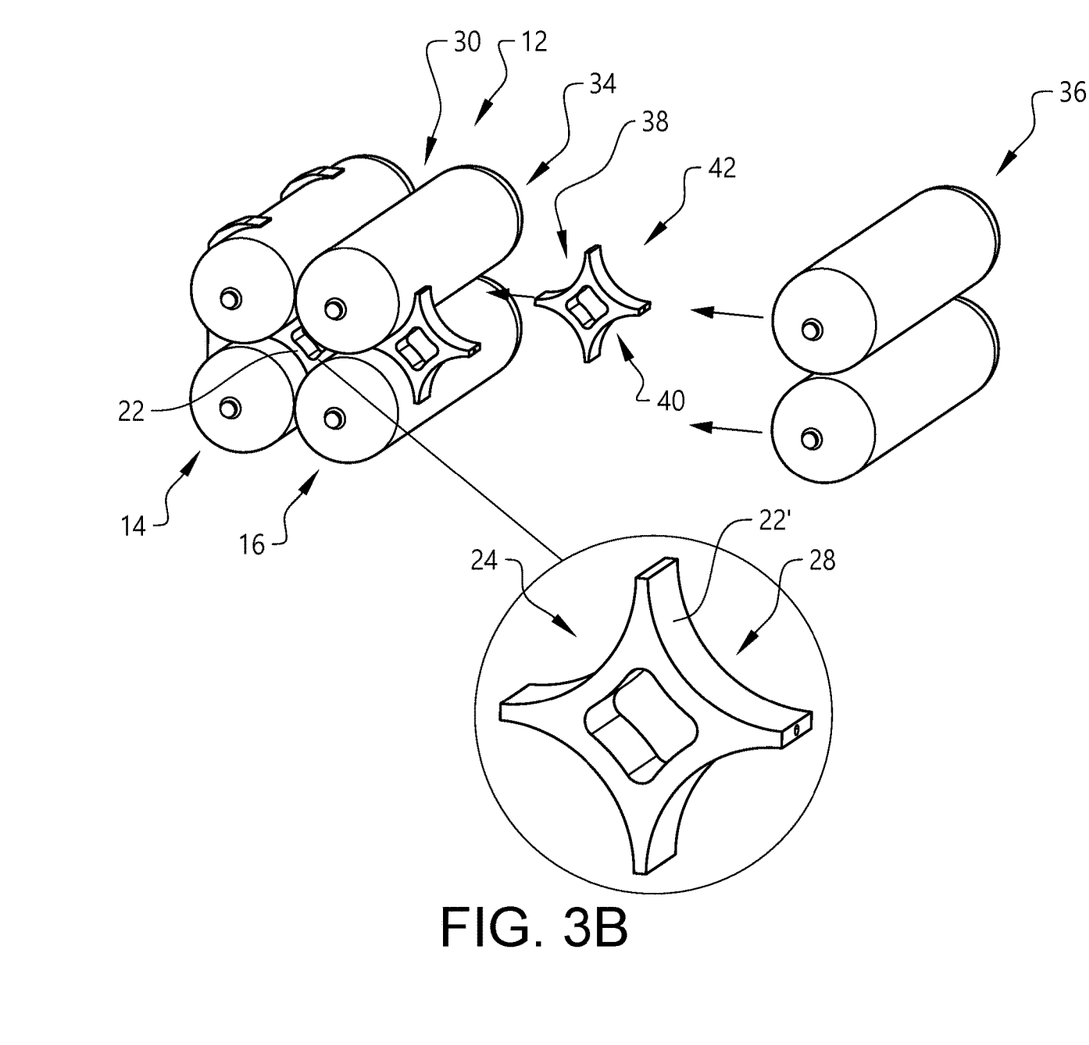

With reference to FIG. 3A and FIG. 3B, an embodiment of the method according to the invention may further comprise the following procedure sequentially for each tank subset adapted to be located between the first tank subset 14 and the last tank subset, and wherein the first intermediate bracket assembly 22 forms a previously attached intermediate bracket assembly for said second tank subset 16:

S22 Connecting a second side 28 (see FIG. 3B) of the previously attached intermediate bracket assembly 22 to the first side 30 of the tank subset 16 to be added to the tank assembly 12. In the FIG. 3A and FIG. 3B embodiment, the tank subset 16 to be added to the tank assembly 12 is constituted by the second tank subset 16 and the previously attached intermediate bracket assembly is constituted by the first intermediate bracket assembly 22.

S24 Connecting a first side 38 of a further intermediate bracket assembly 40 to a second side 34 of the tank subset 16 to be added to the tank assembly 12, wherein the further intermediate bracket assembly 40 and the previously attached intermediate bracket assembly 22 are located on opposite sides of the tank subset 16 to be added to the tank assembly 12.

S26 Attaching the further intermediate bracket assembly 40 to the previously attached intermediate bracket assembly 22 before a tank subset 36 adapted to be subsequently added to the tank assembly 12 is connected to the second side 42 of the further intermediate bracket assembly 40.

S28 Assigning the further intermediate bracket assembly 40 to constitute the previously attached intermediate bracket assembly for a tank subset adapted to be subsequently added to the tank assembly.

The above steps S16-S22 may be performed for each tank subset adapted to be located between the outermost tank subsets of a tank assembly 12. A second side bracket assembly 32 may be connected to the last tank subset to be added to the tank assembly 12, for instance using the procedure as outlined in steps S16-S20 hereinabove.

Purely by way of example, and as indicated in FIG. 2B, each tank subset 14, 16, may comprise at least two tanks 14', 14", 16', 16". However, it is also envisaged that embodiments of the present invention may use tank subsets comprising only one tank (not shown) or three or more tanks (not shown).

As a non-limiting example, the method further comprises fluidly connecting the tanks 14', 14", 16', 16" of said tank subsets 14, 16 to each other. Purely by way of example, and as indicated in FIG. 2B, such fluid connections may be achieved by attaching a conduit assembly 46 to the tanks 14', 14", 16', 16".

Purely by way of example, each tank 14', 14", 16', 16" is a fuel tank, preferably each tank 14', 14", 16', 16" is adapted store fuel at a pressure exceeding 10 bar, preferably exceeding 200 bar, more preferred exceeding 300 bar.

Figure 4:
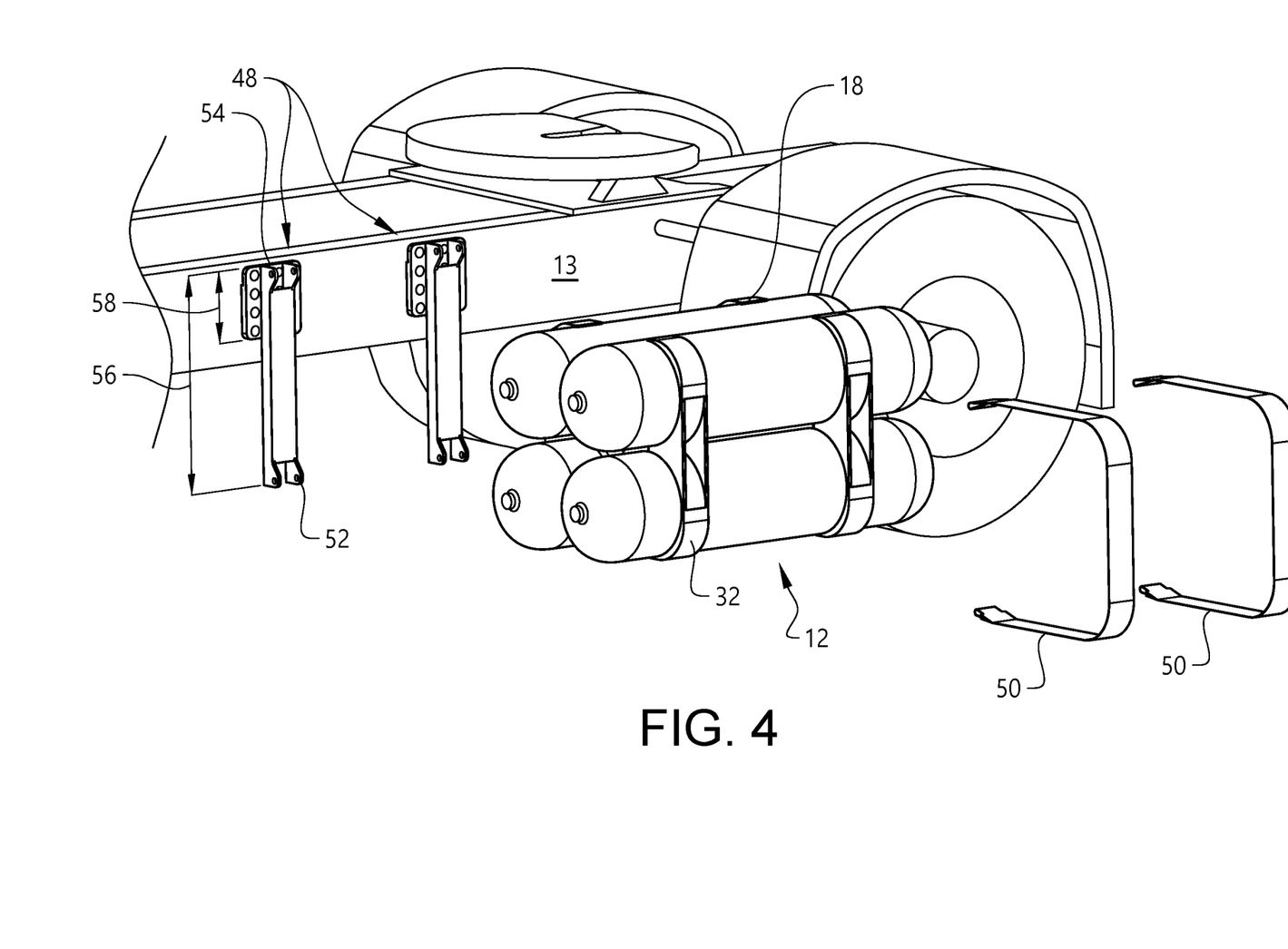
FIG. 4 illustrates another assembling method embodiment in accordance the present invention.

FIG. 4 illustrates an embodiment of a method of a second aspect of the present invention. FIG. 4 illustrates a method for attaching a tank assembly 12 to a vehicle 10, wherein the tank assembly 12 has been assembled according to the first aspect of the present invention, for instance in accordance with the method embodiments presented hereinabove, before being connected to the vehicle 10.

The method for attaching a tank assembly 12 to a vehicle 14 comprises:

S30 Attaching a mounting bracket assembly 48 to the vehicle 10. In the FIG. 4 embodiment, the mounting bracket assembly 48 is attached to the frame 13 of the vehicle 10 (see also FIG. 1).

S32 Connecting the tank assembly 12 to the mounting bracket assembly 48 using one or more straps 50. In the FIG. 4 embodiment, two straps are used.

Purely by way of example, the step S32 of connecting the tank assembly 12 to the mounting bracket assembly 48 using one or more straps 50 may comprise connecting the first side bracket assembly 18 to the mounting bracket assembly 48.

As a non-limiting example, and as illustrated in FIG. 4, the method may comprise connecting the tank assembly 12 to the mounting bracket assembly 48 using one or more straps 50 enclosing the tank assembly 12. Furthermore, as indicated by way of example in FIG. 4, the one or more straps 50 may be connected to the second side bracket assembly 32.

Purely by way of example, the stiffness of the mounting bracket assembly 48 may be substantially lower than the stiffness of the vehicle frame 13 of the vehicle 10. To this end, with reference to FIG. 4, as a non-limiting example, the mounting bracket assembly 48 may comprise a mounting bracket 52 and a mounting bracket attachment member 54 for attaching the mounting bracket 52 to the vehicle 10. In the FIG. 4 embodiment, the mounting bracket assembly 48 comprises two mounting bracket 52, each one of which being connected to a mounting bracket attachment member 54. The mounting bracket 52 is elongate with a main extension and the mounting bracket 52 having a mounting bracket length 56 along the main extension, the length 58 of the mounting bracket attachment member along the main extension being less than 50%, preferably less than 30%, of the mounting bracket length 56.

Figure 5:
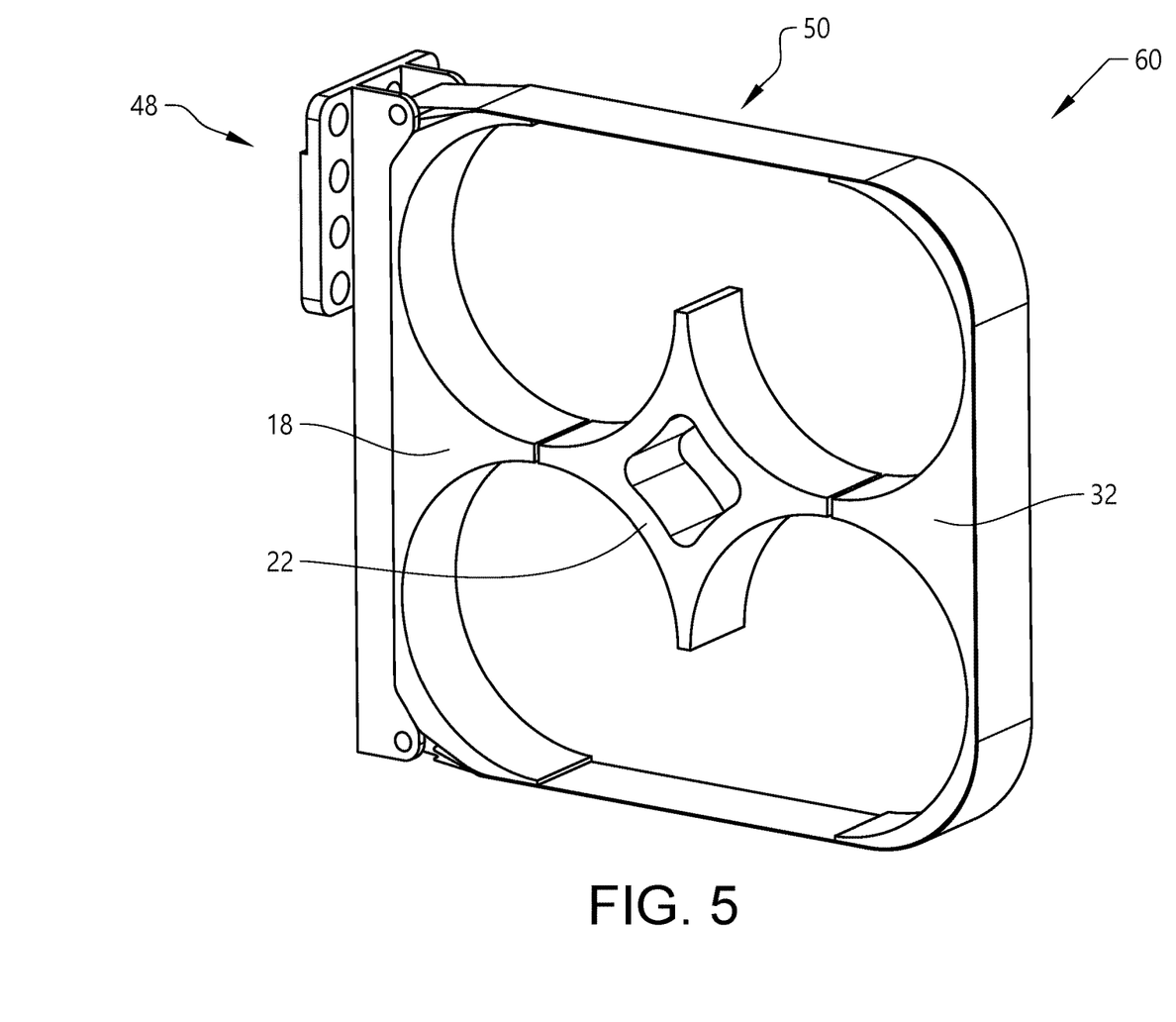
FIG. 5 illustrates a kit for assembling a tank assembly.

FIG. 5 illustrates a kit 60 for assembling a tank assembly for a vehicle. The kit 60 comprises a first side bracket assembly 18, a second side bracket assembly 32 and one or more intermediate bracket assemblies 22. The kit 60 is adapted to be used in a method according to the present invention. The kit 60 illustrated in FIG. 5 further comprises a mounting bracket assembly 48 and a strap 50.

It is to be understood that the present invention is not limited to the embodiments described above and illustrated in the drawings; rather, the skilled person will recognize that many changes and modifications may be made within the scope of the appended claims.

The invention claimed is:

1. A method for assembling a tank assembly for a vehicle, the tank assembly comprising:
   a plurality of tanks comprising:
      a plurality of tank subsets comprising:
         a first tank subset, and
         a second tank subset,
            wherein the first and the second tank subsets are adapted to be adjacent in the tank assembly,
   the method comprising:
   connecting a first side of a first intermediate bracket assembly to a second side of the first tank subset after connecting a first side bracket assembly to a first side of the first tank subset,
   wherein the first intermediate bracket assembly comprises a second side adapted to be connected to a first side of the second tank subset,
   wherein the first side bracket assembly and the first intermediate bracket assembly are located on opposite sides of the first tank subset, and
   attaching the first side bracket assembly to the first intermediate bracket assembly before the second tank subset is connected to the second side of the first intermediate bracket assembly.

2. The method of claim 1, wherein the following is performed for the last tank subset to be added to the tank assembly:
   connecting a second side of a previously attached intermediate bracket assembly to the first side of the last tank subset,
   connecting a second side bracket assembly to a second side of the last tank subset, wherein the previously attached intermediate bracket assembly and the second side bracket assembly are located on opposite sides of the last tank subset, and
   attaching the second side bracket assembly to the previously attached intermediate bracket assembly.

3. The method of claim 2, further comprising the following procedure sequentially for each tank subset adapted to be located between the first tank subset and the last tank subset, wherein the first intermediate bracket assembly forms a previously attached intermediate bracket assembly for the second tank subset:
   connecting a second side of the previously attached intermediate bracket assembly to the first side of the tank subset to be added to the tank assembly,
   connecting a first side of a further intermediate bracket assembly to a second side of the tank subset to be added to the tank assembly, wherein the further intermediate bracket assembly and the previously attached intermediate bracket assembly are located on opposite sides of the tank subset to be added to the tank assembly,
   attaching the further intermediate bracket assembly to the previously attached intermediate bracket assembly before a tank subset adapted to be subsequently added to the tank assembly is connected to the second side of the further intermediate bracket assembly, and
   assigning the further intermediate bracket assembly to constitute the previously attached intermediate bracket assembly for a tank subset adapted to be subsequently added to the tank assembly.

4. The method of claim 1, wherein the tanks are arranged in parallel and each one of the tanks is elongate and extends along a main extension direction, and the first and the second sides of each tank subset extend in a plane comprising the main extension direction.

5. The method of claim 1, wherein each tank subset comprises at least two tanks.

6. The method of claim 1, further comprising fluidly connecting the tanks of the tank subsets to each other.

7. The method of claim 1, wherein each tank is a fuel tank, and preferably each tank is adapted to store fuel at a pressure exceeding 10 bar, preferably exceeding 200 bar, more preferred exceeding 300 bar.

8. A method for attaching a tank assembly to a vehicle, wherein the tank assembly has been assembled using the method of claim 2 before being connected to the vehicle, the method comprising:
attaching a mounting bracket assembly to the vehicle, and connecting the tank assembly to the mounting bracket assembly using one or more straps.

9. The method of claim 8, wherein the step of connecting the tank assembly to the mounting bracket assembly using one or more straps comprises connecting the first side bracket assembly to the mounting bracket assembly.

10. The method of claim 8, wherein the method comprises connecting the tank assembly to the mounting bracket assembly using one or more straps enclosing the tank assembly.

11. The method of claim 10, wherein the one or more straps are connected to the second side bracket assembly.

12. The method of claim 8, wherein the stiffness of the mounting bracket assembly is substantially lower than the stiffness of a vehicle frame of the vehicle.

13. A kit for assembling a tank assembly for a vehicle, the kit comprising a first side bracket assembly, a second side bracket assembly, and one or more intermediate bracket assemblies, the kit being adapted to be used in a method for assembling a tank assembly for a vehicle, the tank assembly comprising:
a plurality of tanks comprising:
a plurality of tank subsets comprising:
a first tank subset, and
a second tank subset,
wherein the first and second tank subsets are adapted to be adjacent in the tank assembly,
the method comprising:
connecting a first side of a first intermediate bracket assembly to a second side of the first tank subset after connecting a first side bracket assembly to a first side of the first tank subset,
wherein the first intermediate bracket assembly comprises a second side adapted to be connected to a first side of the second tank subset,
wherein the first side bracket assembly and the first intermediate bracket assembly are located on opposite sides of the first tank subset, and
attaching the first side bracket assembly to the first intermediate bracket assembly before the second tank subset is connected to the second side of the first intermediate bracket assembly.

14. A method for assembling a tank assembly for a vehicle, the tank assembly comprising a plurality of tanks comprising a plurality of tank subsets comprising a first tank subset and a second tank subset, the first and second tank subsets being adapted to be adjacent in the tank assembly, the method comprising:
connecting a first side of a first intermediate bracket assembly to a second side of the first tank subset after connecting a first side bracket assembly to a first side of the first tank subset,
wherein the first intermediate bracket assembly comprises one or more contact surfaces adapted to contact the first tank subset,
wherein the first intermediate bracket assembly comprises a second side adapted to be connected to a first side of the second tank subset,
wherein the first side bracket assembly and the first intermediate bracket assembly are located on opposite sides of the first tank subset, and
attaching the first side bracket assembly to the first intermediate bracket assembly before the second tank subset is connected to the second side of the first intermediate bracket assembly.

15. A method for assembling a tank assembly for a vehicle, the tank assembly comprising:
a plurality of tanks comprising:
a plurality of tank subsets comprising:
a first tank subset, and
a second tank subset,
wherein the first and the second tank subsets are adapted to be adjacent in the tank assembly,
the method comprising:
connecting a first side of a first intermediate bracket assembly to a second side of the first tank subset after connecting a first side bracket assembly to a first side of the first tank subset,
wherein:
the first intermediate bracket assembly comprises a second side adapted to be connected to a first side of the second tank subset, and
the first side bracket assembly and the first intermediate bracket assembly are located on opposite sides of the first tank subset,
attaching the first side bracket assembly to the first intermediate bracket assembly before the second tank subset is connected to the second side of the first intermediate bracket assembly,
adding the last tank subset to the tank assembly, comprising:
connecting a second side of a previously attached intermediate bracket assembly to the first side of the last tank subset,
connecting a second side bracket assembly to a second side of the last tank subset, wherein the previously attached intermediate bracket assembly and the second side bracket assembly are located on opposite sides of the last tank subset, and
attaching the second side bracket assembly to the previously attached intermediate bracket assembly; and
assembling the tank assembly before connecting the tank assembly to the vehicle, the connecting comprising:
attaching a mounting bracket assembly to the vehicle, and
connecting the tank assembly to the mounting bracket assembly using one or more strap,
wherein the mounting bracket assembly comprises:
a mounting bracket, and
a mounting bracket attachment member for attaching the mounting bracket to the vehicle, and
wherein:
the mounting bracket is elongated with a main extension, the mounting bracket has a mounting bracket length along the main extension, and the length of the mounting bracket attachment member along the main extension is less than 50%, preferably less than 30%, of the mounting bracket length.

\* \* \* \* \*